US009794477B2

(12) United States Patent  (10) Patent No.: US 9,794,477 B2
Iwane  (45) Date of Patent: Oct. 17, 2017

(54) IMAGE-CAPTURING DEVICE AND IMAGE PROCESSING METHOD

(71) Applicant: NIKON CORPORATION, Tokyo (JP)

(72) Inventor: Toru Iwane, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/263,540

(22) Filed: Apr. 28, 2014

(65) Prior Publication Data

US 2014/0232897 A1    Aug. 21, 2014

Related U.S. Application Data

(63) Continuation of application No. 13/127,163, filed as application No. PCT/JP2009/069053 on Nov. 9, 2009, now Pat. No. 9,749,657.

(30) Foreign Application Priority Data

Nov. 7, 2008    (JP) .................................. 2008-286800

(51) Int. Cl.
 *H04N 5/232*    (2006.01)
 *G06T 1/00*    (2006.01)
 *H04N 5/225*    (2006.01)

(52) U.S. Cl.
 CPC .......... *H04N 5/23235* (2013.01); *G06T 1/00* (2013.01); *H04N 5/2254* (2013.01);
 (Continued)

(58) Field of Classification Search
 CPC ............. H04N 5/2254; H04N 5/23212; H04N 5/23229; H04N 5/23235; H04N 5/2259;
 (Continued)

(56) References Cited

U.S. PATENT DOCUMENTS 5,076,687 A    12/1991  Adelson
7,732,744 B2 *  6/2010  Utagawa ................... 250/208.1
(Continued)

FOREIGN PATENT DOCUMENTS

JP    A-2007-004471    1/2007
JP    A-2007-074079    3/2007
(Continued)

OTHER PUBLICATIONS

Ng et al., "Light Field Photography with a Hand-held Plenoptic Camera," *Stanford Tech Report CTSR*, Feb. 2005, pp. 1-11.
(Continued)

*Primary Examiner* — Luong T Nguyen
(74) *Attorney, Agent, or Firm* — Oliff PLC

(57) ABSTRACT

An image-capturing device includes: a photographic optical system; a photoelectric conversion element array made up with a plurality of photoelectric conversion elements arrayed therein; a micro-lens array made up with a plurality of micro-lenses arrayed therein; a data creation unit that creates pixel data at a plurality of pixels on a specific image forming plane by applying filter matrix data to output signals provided from the plurality of photoelectric conversion elements; and an image synthesis unit that synthetically generates an image on the specific image forming plane at a given position assumed along an optical axis of the photographic optical system, based upon the pixel data. The filter matrix data assume a two-dimensional data array pattern conforming to a specific intensity distribution with a distribution center thereof set at an element corresponding to a central position of a projection image of each of the plurality of pixels.

10 Claims, 13 Drawing Sheets

(52) U.S. Cl.
CPC ....... *H04N 5/2259* (2013.01); *H04N 5/23212* (2013.01); *H04N 5/23232* (2013.01)

(58) Field of Classification Search
CPC .............. H04N 5/23232; G02B 3/0056; G02B 3/0062; G06T 1/00
See application file for complete search history.

(56) References Cited

U.S. PATENT DOCUMENTS

| | | | | |
|---|---|---|---|---|
| 8,749,657 | B2* | 6/2014 | Iwane | 348/222.1 |
| 2007/0091197 | A1* | 4/2007 | Okayama | G02B 3/0056 348/340 |
| 2007/0252074 | A1* | 11/2007 | Ng et al. | 250/208.1 |
| 2008/0266655 | A1* | 10/2008 | Levoy et al. | 359/368 |
| 2009/0027542 | A1* | 1/2009 | Yamamoto et al. | 348/340 |
| 2009/0140131 | A1* | 6/2009 | Utagawa | 250/226 |
| 2009/0185801 | A1* | 7/2009 | Georgiev et al. | 396/332 |
| 2009/0190022 | A1 | 7/2009 | Ichimura | |

FOREIGN PATENT DOCUMENTS

| | | |
|---|---|---|
| JP | A-2007-312314 | 11/2007 |
| WO | WO 2006/137481 A1 | 12/2006 |

OTHER PUBLICATIONS

International Search Report issued in Application No. PCT/JP2009/069053; Dated Feb. 16, 2010.
Feb. 3, 2014 Notice of Allowance in U.S. Appl. No. 13/127,163.

* cited by examiner

FIG.4

| 0 | 0 | 0 | 0 | 0 | 0 | 0 | 0 | 0 | 0 | 0 |
|---|---|---|---|---|---|---|---|---|---|---|
| 0 | 0 | 0 | 2 | 4 | 5 | 4 | 2 | 0 | 0 | 0 |
| 0 | 0 | 3 | 10 | 21 | 27 | 21 | 10 | 3 | 0 | 0 |
| 0 | 2 | 10 | 35 | 73 | 94 | 73 | 35 | 10 | 2 | 0 |
| 0 | 4 | 21 | 73 | 155 | 199 | 155 | 73 | 21 | 4 | 0 |
| 0 | 5 | 27 | 94 | 199 | 255 | 199 | 94 | 27 | 5 | 0 |
| 0 | 4 | 21 | 73 | 155 | 199 | 155 | 73 | 21 | 4 | 0 |
| 0 | 2 | 10 | 35 | 73 | 94 | 73 | 35 | 10 | 2 | 0 |
| 0 | 0 | 3 | 10 | 21 | 27 | 21 | 10 | 3 | 0 | 0 |
| 0 | 0 | 0 | 2 | 4 | 5 | 4 | 2 | 0 | 0 | 0 |
| 0 | 0 | 0 | 0 | 0 | 0 | 0 | 0 | 0 | 0 | 0 |

| 3 | 10 | 21 | 27 | 21 | 10 | 3 | 0 | 0 | 0 | 0 | 0 |
|---|----|----|----|----|----|---|---|---|---|---|---|
| 10 | 35 | 73 | 94 | 73 | 35 | 10 | 2 | 0 | 0 | 0 | 0 |
| 21 | 73 | 155 | 199 | 155 | 73 | 21 | 4 | 0 | 0 | 0 | 0 |
| 27 | 94 | 199 | 255 | 199 | 94 | 27 | 5 | 0 | 0 | 0 | 0 |
| 21 | 73 | 155 | 199 | 155 | 73 | 21 | 4 | 0 | 0 | 0 | 0 |
| 10 | 35 | 73 | 94 | 73 | 35 | 10 | 2 | 0 | 0 | 0 | 0 |
| 3 | 10 | 21 | 27 | 21 | 10 | 3 | 0 | 0 | 0 | 0 | 0 |
| 0 | 2 | 4 | 5 | 4 | 2 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

(b)

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 2 | 4 | 5 | 4 | 2 | 0 | 0 |
| 0 | 0 | 0 | 3 | 10 | 21 | 27 | 21 | 10 | 3 | 0 |
| 0 | 0 | 0 | 10 | 35 | 73 | 94 | 73 | 35 | 10 | 0 |
| 0 | 0 | 0 | 21 | 73 | 155 | 199 | 155 | 73 | 21 | 0 |
| 0 | 0 | 0 | 27 | 94 | 199 | 255 | 199 | 94 | 27 | 0 |
| 0 | 0 | 0 | 21 | 73 | 155 | 199 | 155 | 73 | 21 | 0 |
| 0 | 0 | 0 | 10 | 35 | 73 | 94 | 73 | 35 | 10 | 0 |
| 0 | 0 | 0 | 3 | 10 | 21 | 27 | 21 | 10 | 3 | 0 |

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 2 | 4 | 5 | 4 | 2 | 0 | 0 | 0 |
| 0 | 0 | 0 | 3 | 10 | 21 | 27 | 21 | 10 | 3 | 0 | 0 |
| 0 | 0 | 2 | 10 | 35 | 73 | 94 | 73 | 35 | 10 | 2 | 0 |
| 0 | 0 | 4 | 21 | 73 | 155 | 199 | 155 | 73 | 21 | 4 | 0 |
| 0 | 0 | 5 | 27 | 94 | 199 | 255 | 199 | 94 | 27 | 5 | 0 |
| 0 | 0 | 4 | 21 | 73 | 155 | 199 | 155 | 73 | 21 | 4 | 0 |
| 0 | 0 | 2 | 10 | 35 | 73 | 94 | 73 | 35 | 10 | 2 | 0 |
| 0 | 0 | 0 | 3 | 10 | 21 | 27 | 21 | 10 | 3 | 0 | 0 |
| 0 | 0 | 0 | 0 | 2 | 4 | 5 | 4 | 2 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

(b)

| 0 | 0 | 2 | 4 | 5 | 4 | 2 | 0 | 0 | 0 | 0 | 0 |
|---|---|---|---|---|---|---|---|---|---|---|---|
| 3 | 10 | 21 | 27 | 21 | 10 | 3 | 0 | 0 | 0 | 0 | 0 |
| 10 | 35 | 73 | 94 | 73 | 35 | 10 | 2 | 0 | 0 | 0 | 0 |
| 21 | 73 | 155 | 199 | 155 | 73 | 21 | 4 | 0 | 0 | 0 | 0 |
| 27 | 94 | 199 | 255 | 199 | 94 | 27 | 5 | 0 | 0 | 0 | 0 |
| 21 | 73 | 155 | 199 | 155 | 73 | 21 | 4 | 0 | 0 | 0 | 0 |
| 10 | 35 | 73 | 94 | 73 | 35 | 10 | 2 | 0 | 0 | 0 | 0 |
| 3 | 10 | 21 | 27 | 21 | 10 | 3 | 0 | 0 | 0 | 0 | 0 |
| 0 | 0 | 2 | 4 | 5 | 4 | 2 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

| 0 | 0 | 0 | 0 | 0 | 1 | 0 | 0 | 0 | 0 | 0 |
|---|---|---|---|---|---|---|---|---|---|---|
| 0 | 0 | 1 | 1 | 1 | 1 | 1 | 1 | 1 | 0 | 0 |
| 0 | 1 | 1 | 1 | 1 | 1 | 1 | 1 | 1 | 1 | 0 |
| 0 | 1 | 1 | 1 | 1 | 1 | 1 | 1 | 1 | 1 | 0 |
| 0 | 1 | 1 | 1 | 1 | 1 | 1 | 1 | 1 | 1 | 0 |
| 1 | 1 | 1 | 1 | 1 | 1 | 1 | 1 | 1 | 1 | 1 |
| 0 | 1 | 1 | 1 | 1 | 1 | 1 | 1 | 1 | 1 | 0 |
| 0 | 1 | 1 | 1 | 1 | 1 | 1 | 1 | 1 | 1 | 0 |
| 0 | 1 | 1 | 1 | 1 | 1 | 1 | 1 | 1 | 1 | 0 |
| 0 | 0 | 1 | 1 | 1 | 1 | 1 | 1 | 1 | 0 | 0 |
| 0 | 0 | 0 | 0 | 0 | 1 | 0 | 0 | 0 | 0 | 0 |

(a)

(b)

IMAGE-CAPTURING DEVICE AND IMAGE PROCESSING METHOD

This is a Continuation of U.S. patent application Ser. No. 13/127,163 filed May 2, 2011 (now U.S. Pat. No. 8,749,657), which is the U.S. National Stage of International Application No. PCT/JP2009/069053 filed Nov. 9, 2009, which claims priority from Japanese Application No. 2008-286800 filed Nov. 7, 2008. The disclosure of each of the prior applications is hereby incorporated by reference herein in its entirety.

TECHNICAL FIELD

The present invention relates to an image-capturing device capable of image synthesis and an image processing method that enables image synthesis.

BACKGROUND ART

There is an image synthesis-capable camera known in the related art that synthesizes an image focused at a given position along the optical axis of a photographic optical system by using the photographic optical system with a photoelectric conversion element array that includes a plurality of photoelectric conversion elements arrayed behind each of a plurality of micro-lenses, and a micro-lens array made up with the plurality of micro-lenses disposed between the photoelectric optical system and the photoelectric conversion element array (see patent literature 1).

CITATION LIST

Patent Literature

Patent literature 1: Japanese Laid Open Patent Publication No. 2007-004471

SUMMARY OF INVENTION

Technical Problem

The image synthesis-capable camera in the related art described above, equipped with an image sensor constituted with the micro-lens array and the photoelectric conversion element array, generates digital image data by forming, via the photographic optical system, a subject image on a plane ranging substantially over apexes of the micro-lenses in the micro-lens array and receiving light from each micro-lens at photoelectric conversion elements occupying positions substantially matching the focusing positions of the micro-lenses. This means that the image captured by the image synthesis-capable camera in the related art is constituted with pixels the size of which matches the size of the micro-lenses and that the resolution of the image is equivalent to, and limited by the size of the micro-lenses.

In addition, the position of the image synthesizing plane assumed relative to the depth of the captured image, i.e., the position of the image synthesizing plane along a direction perpendicular to the optical axis of the photographic optical system in the image synthesis-capable camera in the related art described above, can be adjusted in a finer adjustment when the number of photoelectric conversion elements provided in correspondence to each of the micro-lenses in the micro-lens array is greater. However, there is a limit to the extent to which the number of photoelectric conversion elements disposed in correspondence to each micro-lens can be increased by reducing the size of the individual photoelectric conversion elements in the photoelectric conversion element array while, at the same time, miniaturizing the micro-lenses.

Solution to Problem

According to the 1st aspect of the present invention, an image-capturing device comprises: a photographic optical system; a photoelectric conversion element array made up with a plurality of photoelectric conversion elements, each of which receives a light flux having been transmitted through the photographic optical system and outputs a signal, arrayed therein; a micro-lens array disposed between the photographic optical system and the photoelectric conversion element array and made up with a plurality of micro-lenses arrayed therein, with the plurality of photoelectric conversion elements, arrayed at the photoelectric conversion element array, present behind each of the plurality of micro-lenses; a data creation unit that creates pixel data at a plurality of pixels on a specific image forming plane, at which an image is formed through the photographic optical system, in correspondence to each micro-lens among the plurality of micro-lenses by applying filter matrix data to output signals provided from the plurality of photoelectric conversion elements; and an image synthesis unit that synthetically generates an image on the specific image forming plane at a given position assumed along an optical axis of the photographic optical system, based upon the pixel data created by the data creation unit. The filter matrix data assume a two-dimensional data array pattern conforming to a specific intensity distribution with a distribution center thereof set at an element corresponding to a central position of a projection image of each of the plurality of pixels, projected on the photoelectric conversion element array via the each micro-lens among the plurality of micro-lenses.

According to the 2nd aspect of the present invention, in the image-capturing device according to the 1st aspect, it is preferred that the central position is determined depending upon a position of the specific image forming plane assumed along the optical axis; and the specific intensity distribution is altered in correspondence to the central position.

According to the 3rd aspect of the present invention, in the image-capturing device according to the 1st or the 2nd aspect, it is preferred that the photographic optical system has a focus adjustment function whereby the position of the specific image forming plane assumed along the optical axis, at which focus is achieved for a subject image, is changed.

According to the 4th aspect of the present invention, in the image-capturing device according to the 1st or the 2nd aspect, it is preferred that the specific intensity distribution is a Gaussian distribution assuming a highest level of intensity at the distribution center.

According to the 5th aspect of the present invention, in the image-capturing device according to the 3rd aspect, it is preferred that the photographic optical system engages the focus adjustment function thereof to change the position of the specific image forming plane assumed along the optical axis, so as to ensure that a distance between the position of the specific image forming plane assumed along the optical axis and the micro-lens array is kept within a range of approximately 1 to 3 times a focal length of the each of the plurality of micro-lenses.

According to the 6th aspect of the present invention, in the image-capturing device according to the 1st aspect, it is preferred that the image synthesis unit includes an image forming position altering unit that alters the position of the specific image forming plane; and the data creation unit alters the specific intensity distribution in correspondence to the central position, which changes in correspondence to the position of the specific image forming plane.

According to the 7th aspect of the present invention, in the image-capturing device according to the 6th aspect, it is preferred that the image forming position altering unit changes the position of the specific image forming plane, so as to ensure that a distance between the position of the specific image forming plane and the micro-lens array is kept within a range of approximately 1 to 3 times a focal length of the each of the plurality of micro-lenses.

According to the 8th aspect of the present invention, an image processing method to be adopted when processing an image captured with an image-capturing device, including a photographic optical system, a photoelectric conversion element array made up with a plurality of photoelectric conversion elements, each of which receives a light flux having been transmitted through the photographic optical system arrayed therein and outputting a signal and a micro-lens array disposed between the photographic optical system and the photoelectric conversion element array and made up with a plurality of micro-lenses arrayed therein comprises: creating pixel data at a plurality of pixels on a specific image forming plane at which an image is formed via the photographic optical system, in correspondence to each micro-lens among the plurality of micro-lenses, by applying filter matrix data, assuming a two-dimensional data array pattern conforming to a specific intensity distribution with a distribution center thereof set at an element corresponding to a central position of a projection image of each of the plurality of pixels, projected on the photoelectric conversion element array via the each micro-lens among the plurality of micro-lenses, to output signals provided from the plurality of photoelectric conversion elements; and generating a synthesized image on the specific image forming plane at a given position assumed along an optical axis of the photographic optical system based upon the pixel data.

BRIEF DESCRIPTION OF THE DRAWINGS

FIG. 4 presents an example of a two-dimensional filter matrix.

FIG. 5 presents examples of two-dimensional filter matrices.

FIG. 6 presents examples of two-dimensional filter matrices.

FIG. 9 presents examples of two-dimensional filter matrices that may be achieved in a variation.

FIG. 11 presents an example of a mask matrix that may be used to obtain a photoelectric conversion element output matrix corresponding to the micro-lenses in a micro-lens array according to a dense hexagonal array pattern.

DESCRIPTION OF EMBODIMENTS

Figure 1:
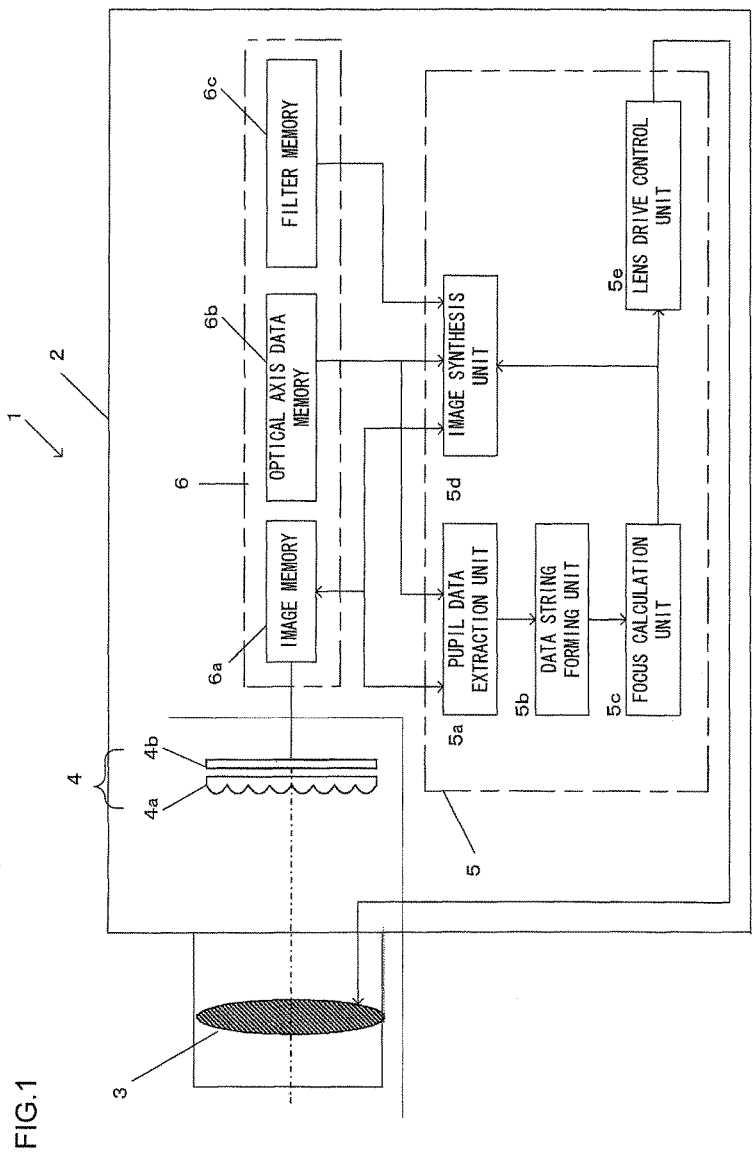
FIG. 1 shows the structure of a digital camera achieved in an embodiment.

An embodiment achieved by adopting the image-capturing device according to the present invention in a digital camera is described. FIG. 1, in reference to which the embodiment is to be described, shows the structure of the digital camera achieved in the embodiment. It is to be noted that FIG. 1 only shows the devices and units directly relevant to the present invention.

The digital camera 1 achieved in the embodiment includes a photographic lens 3 attached to the camera body 2. An image sensor 4, a drive control device 5, a memory 6 and the like are disposed at the camera body 2. The image sensor 4 is constituted with a micro-lens array 4a with very small micro-lenses 40a densely arrayed on a flat plane and a photoelectric conversion element array 4b with extremely small photoelectric conversion elements densely arrayed on a flat plane.

The micro-lenses in the micro-lens array 4a in the embodiment are arrayed two-dimensionally in a dense square grid array pattern. However, the present invention is not limited to this example and may be adopted in conjunction with micro-lenses disposed in a staggered array pattern or a honeycomb array pattern (dense hexagonal pattern) instead of the square array pattern.

Figure 2:
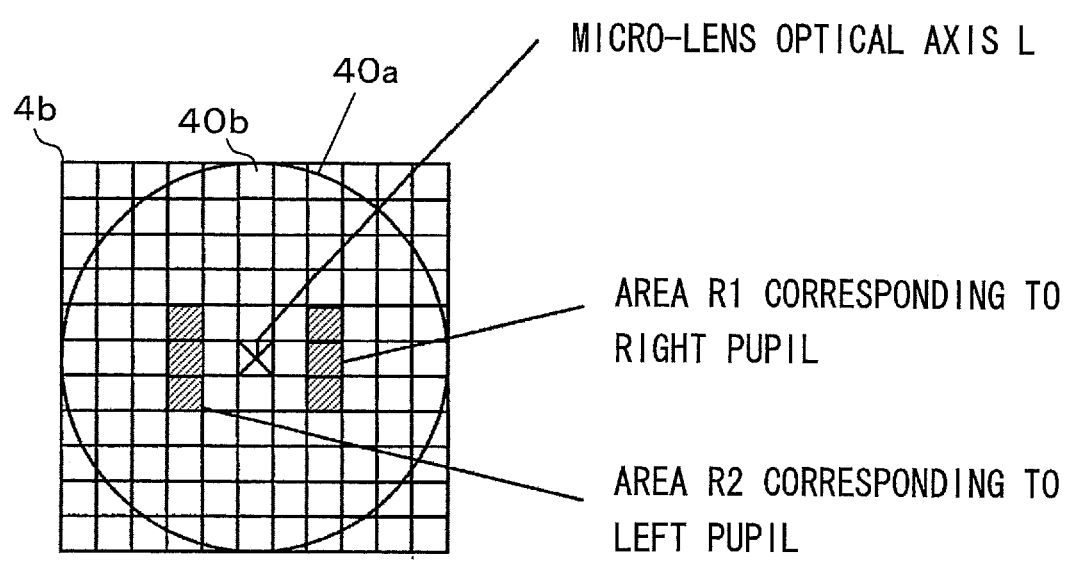
FIG. 2 shows the outer circumference of one of the micro-lenses in the micro-lens array projected onto the photoelectric conversion element array.

FIG. 2 shows the outer circumference of one of micro-lenses 40a in the micro-lens array 4a, projected onto the photoelectric conversion element array 4b. In the embodiment, extremely small photoelectric conversion elements 40b in the photoelectric conversion element array 4b are disposed in a square grid array pattern on a light-receiving surface assuming a position matching the focal length of the micro-lenses 40a. A plurality of photoelectric conversion elements 40b in the photoelectric conversion element array 4b are present within the range of the outer circumference of each micro-lens 40a in the micro-lens array 4a, as shown in FIG. 2. In other words, a light flux having passed through a single micro-lens is received at a plurality of photoelectric conversion elements 40b.

The diameter of the micro-lenses 40a in the embodiment is equal to the sum of the lengths of eleven photoelectric conversion elements and thus, each micro-lens corresponds to a photoelectric conversion element matrix with a square grid array pattern made up with 11 (down)×11 (across) photoelectric conversion elements. It is to be noted, however, that the number of photoelectric conversion elements 40b to correspond to each micro-lens 40a is not limited to that in the embodiment, i.e., 11×11. In addition, the concepts of the "right pupil", the "left pupil" and the "micro-lens optical axis L" in FIG. 2 will be described in detail later.

The drive control device 5 in FIG. 1, which includes a microcomputer and peripheral components such as a memory, an A/D converter and a drive circuit (none shown), executes sequence control, lens drive control, aperture drive control, mirror drive control and the like, as well as control of various arithmetic operations executed in the camera 1. The drive control device 5 includes a pupil data extraction unit 5a, a data string forming unit 5b, a focus calculation unit 5c, an image synthesis unit 5d, a lens drive control unit 5e and the like, which are functional units achieved in microcomputer software. These units 5a through 5e will be described in detail later.

Various types of data and images are stored in the memory 6. Images captured via the image sensor 4 are stored in the image memory 6a. In an optical axis data memory 6b, position data indicating the position of an optical axis L of each micro-lens 40a constituting the micro-lens array 4a, as shown in FIG. 2, are stored. The optical axis position data indicate the position of the optical axis L of each micro-lens 40a as a position assumed in the photoelectric conversion element array 4b with coordinate values in decimal terms in a coordinate system with which the positions of the individual photoelectric conversion elements 40b in the photoelectric conversion element array 4b can be indicated. Namely, a position of the optical axis L can be indicated with precision by using decimal values, e.g., 0.5 representing 0.5 photoelectric conversion elements 40b, which is smaller than the value of 1 representing a single photoelectric conversion element 40b.

It is to be noted that FIG. 2 presents an example in which the optical axis L of the micro-lens 40a is located at the center of the square grid array pattern made up with 11 (down)×11 (across) photoelectric conversion elements in the photoelectric conversion element array 4b (indicated by the x mark in FIG. 2), i.e., the center of the photoelectric conversion element 40b at the center of the photoelectric conversion element array pattern 4b. However, it is difficult in reality to manufacture the micro-lens array 4a and the photoelectric conversion element array 4b so as to set the optical axis L of the micro-lens array pattern 40a at the exact center of a photoelectric conversion element 40b.

Accordingly, based upon the optical axis position data for the optical axis L of each micro-lens 40a stored in the optical axis data memory 6b, the output of a virtual photoelectric conversion element 400b, through the center of which the optical axis L of the micro-lens 40a passes, is calculated through arithmetic operation by referencing the signals output from the photoelectric conversion elements 40b corresponding to the particular micro-lens 40a. A matrix of the outputs from virtual photoelectric conversion elements assuming a square grid array pattern made up with 11 (down)×11 (across) photoelectric conversion elements, indicating the outputs of the virtual photoelectric conversion elements 400b, is prepared and the matrix is used in the image synthesis executed as described later in the embodiment. It is to be noted that by regarding the matrix of the virtual photoelectric conversion element outputs thus determined as part of a photoelectric conversion element matrix to be described below, the virtual photoelectric conversion element output matrix can be understood in the same way as a matrix with a positional arrangement such as that shown in FIG. 2, in which the optical axis L of the micro-lens 40a is located at the center of a photoelectric conversion element 40b. In order to simplify the description, the following explanation is given by assuming that the optical axis L of the micro-lens 40a is set at the center of a photoelectric conversion element 40b.

In a filter memory 6c, two-dimensional filters, to be applied to the photoelectric conversion element matrices when synthesizing an image on a plane perpendicular to the optical axis of the photographic lens 3, are stored. The two-dimensional filters are to be described in detail later.

Next, the principle of high-resolution image synthesis is described. As explained earlier, a synthetically generated image in a camera capable of image synthesis in the related art is constituted with pixels, the size of which matches the size of the micro-lenses and thus, the maximum resolution of the image is equivalent to the micro-lens size. An image that may be synthetically generated through the embodiment, in contrast, is a high-definition image constituted with pixels smaller than the micro-lenses and thus achieves greater resolution, beyond the resolving power of the micro-lenses.

Figure 3:
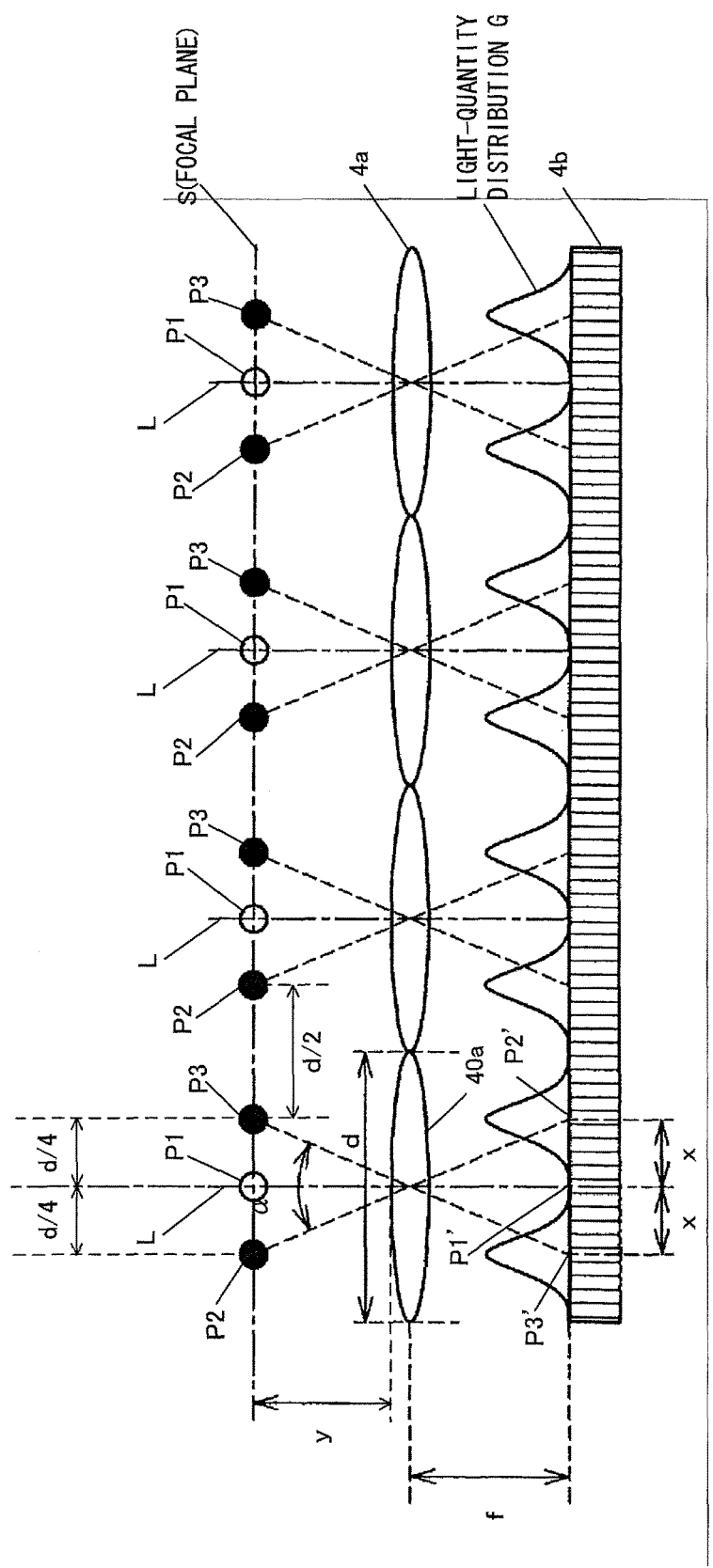
FIG. 3 is a sectional view of parts of the micro-lens array and the photoelectric conversion element array, taken across a plane containing the optical axis of the photographic lens.

FIG. 3 is a sectional view of parts of the micro-lens array 4a and the photoelectric conversion element array 4b, taken on a plane containing the optical axis of the photographic lens 3. FIG. 3 shows the image forming plane of the photographic lens 3, i.e., a focal plane S, assuming a position set apart by a distance y from a plane (hereafter referred to as a "micro-lens apex plane") upon which the apexes of the micro-lenses 40a in the micro-lens array 4a are present. In the example presented in the figure, the distance y is slightly greater (y>f) than the focal length f of the micro-lenses 40a in the micro-lens array 4a. The micro-lenses 40a are extremely thin, and accordingly, the following description is given by assuming that the thickness of the micro-lenses 40a is substantially equal to 0 and thus may be disregarded. In the embodiment, a subject image formed through the photographic lens 3 at the focal plane S is synthetically generated based upon an output from the photoelectric conversion element array 4b. It is to be noted that while the subject image formed on the focal plane S manifests as a two-dimensional form at the focal plane S, the concept of the image synthesis in the embodiment is described in reference to FIG. 3 in conjunction with a single plane (hereafter referred to as the "plane in FIG. 3") that contains the optical axis of the photographic lens 3 alone. The following description is given by assuming that the focal length of the photographic lens 3 is substantially equal to the focal length of the micro-lenses 40a.

A light flux having passed through a point P1, at which the focal plane S and the optical axis L of each micro-lens intersect each other, and guided to the photoelectric conversion element array 4b via the particular micro-lens 40a forms a blurred image on the photoelectric conversion element array 4b in correspondence to the micro-lens 40a. The blurred image is centered on the position P1' of the optical axis of the micro-lens 40a (the position at which the optical axis L of the micro-lens 40a intersects the light-receiving surface of the photoelectric conversion element array 4b) and manifests a light-quantity distribution centered on the photoelectric conversion element 40b at the point P1'. The photoelectric conversion element array 4b outputs image signals each corresponding to the light-quantity distribution manifesting for a specific micro-lens 40a. The image synthesis-capable camera in the related art described above synthesizes the images at the individual points P1 formed on the focal plane S with the image signals each corresponding to one of the micro-lenses 40a. As a result, a subject image constituted with pixels each corresponding to one of the micro-lenses 40a and each centered on a point P1 on the focal plane S is synthetically generated.

Figure 13:
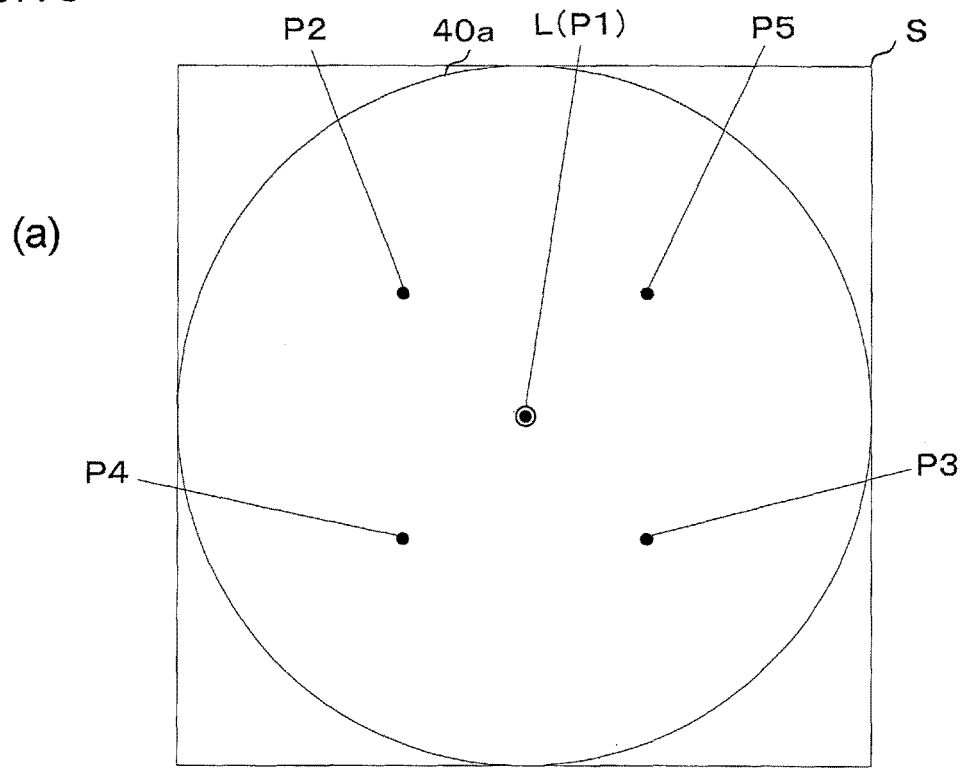
FIG. 13 indicates the positions of virtual pixels taken on the focal plane and the positions of the centers of blurred images of the virtual pixels formed on the photoelectric conversion element array.
Figure 13:
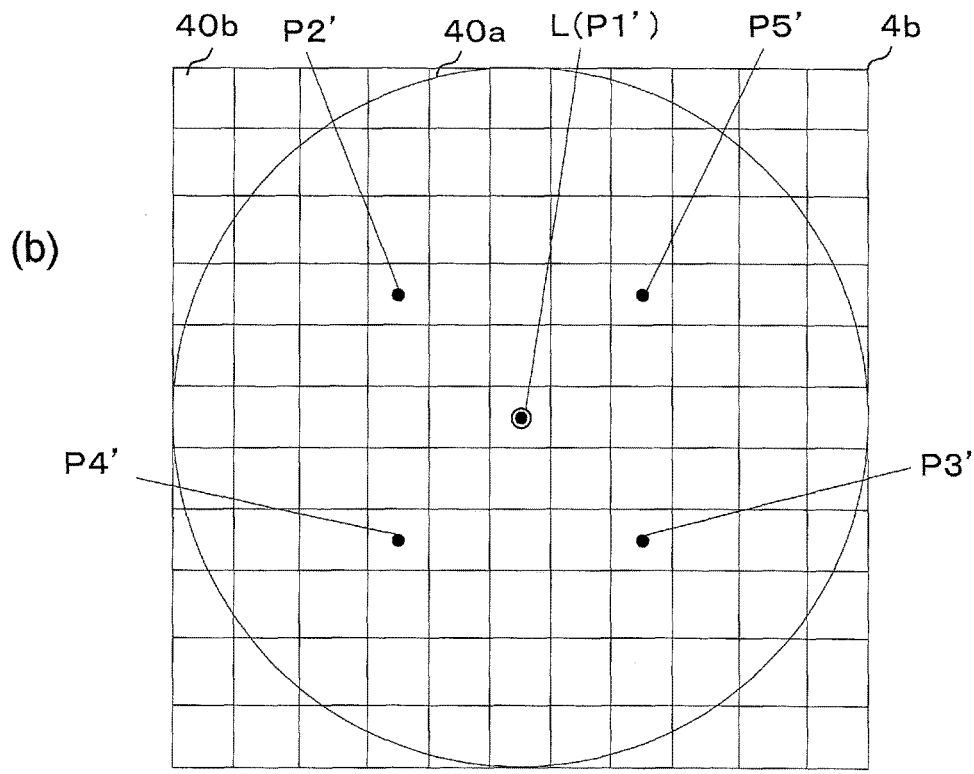

The embodiment is unique in that a plurality of points, i.e., two points P2 and P3 in the example presented in FIG. 3, are set over equal intervals so as to achieve symmetry relative to the optical axis L of each micro-lens 40a. In addition, a plurality of points, i.e., two points P4 and P5 in this example, are set over equal intervals so as to achieve symmetry relative to the optical axis L of each micro-lens at a section obtained by cutting away parts of the micro-lens array 4a and the photoelectric conversion element array 4b with a plane (not shown) rotated by 90° relative to the plane shown in FIG. 3 around the optical axis of the photographic lens 3. FIG. 13(a) shows the relationship among the points P2, P3, P4 and P5 observed on the focal plane S. FIG. 13(a) shows only part of the focal plane S. In order to facilitate the explanation, the figure also shows the outer edge of a micro-lens 40a assuming a position behind the focal plane S. In the embodiment, the points P2, P3, P4 and P5 are designated as virtual pixels and a synthetic subject image constituted with these four pixels is generated in correspondence to each micro-lens 40a.

While the image synthesis-capable camera in the related art described earlier synthetically generates an image constituted with a single pixel at the point P1 in correspondence to each micro-lens 40a, a synthesized image constituted with virtual pixels assuming the four positions P2, P3, P4 and P5 is generated in correspondence to each micro-lens 40a in the embodiment. In other words, the image synthesized through the embodiment is constituted with four times the number of pixels than the image synthesized in the image synthesis-capable camera in the related art and the synthesized image generated through the embodiment thus achieves a resolution four times that of the camera in the related art. It is to be noted that while the method for synthesizing an image at the plane in FIG. 3 is described below, an image may be synthetically generated at the plane rotated relative to the plane shown in FIG. 3 by 90° around the optical axis of the photographic lens 2 in much the same way.

A light flux having passed through a point P2 on the focal plane S in FIG. 3 and guided to the photoelectric conversion element array 4b via the corresponding micro-lens 40a forms a blurred image at a position P2' on the photoelectric conversion element array 4b in correspondence to the particular micro-lens 40a. In addition, a light flux having passed through a point P3 on the focal plane S and guided to the photoelectric conversion element array 4b via the corresponding micro-lens 40a forms a blurred image at a position P3' on the photoelectric conversion element array 4b in correspondence to the particular micro-lens 40a. These blurred images assume light-quantity distributions G centered on the image centers P2' and P3' respectively, and the photoelectric conversion element array 4b outputs image signals corresponding to the light-quantity distributions G for each micro-lens 40a.

While the blurred images of the points P2 and P3, projected via each micro-lens 40a onto the photoelectric conversion element array 4b, demonstrate varying point image distributions depending upon the condition of the curvature at the micro-lens 40a, the description of the embodiment is given by assuming that the blurred images have Gaussian light-quantity distributions, so as to simplify the explanation.

When the focal plane S is set at a position between the micro-lens apex plane and the position set apart from the micro-lens apex plane by a distance matching the focal length f of the micro-lenses (when 0<y<f), the focal plane S is closer to the micro-lens array 4a than the focal plane in the example presented in FIG. 3. As the focal plane S moves closer to the micro-lens array 4a, the angle α formed by the central axes of the light fluxes departing the points P2 and P3 increases relative to the angle shown in FIG. 3. As a result, the extent of blurring of the blurred images of the points P2 and P3 will exceed the range of the photoelectric conversion elements 40b covered by the particular micro-lens 40a, as shown in FIG. 2, and the blurred images will spread over to the photoelectric conversion elements 40b covered by adjacent micro-lenses 40a, making it difficult to synthesize blurred images of the points P2 and P3.

In contrast, when the focal plane S assumes a position further toward the photographic lens 3 and set apart from the micro-lens apex plane by a distance greater than the focal length f of the micro-lenses 40a (y>f), the angle α formed by the central axes of the light fluxes departing the points P2 and P3 decreases relative to the angle shown in FIG. 3, as the distance (y) increases. Accordingly, the blurred images of the point P2 and B3 will become condensed and come closer to each other on the photoelectric conversion element array 4b. Since they are contained within the range of the photoelectric conversion elements 40b covered by the corresponding micro-lens 40a, as shown in FIG. 2, blurred images of the points P2 and P3 can be synthetically generated. As the distance (y) further increases, the blurred images of the points P2 and P3 will become too close to each other at the photoelectric conversion element array 4b and the two blurred images will no longer be distinguishable from each other. This means that the focal plane S must assume a position within an optimal range for synthesized image generation. This point will be described in detail later.

Assuming that the micro-lenses 40a are disposed with an array patterning pitch d, the points P2 and P3, set alternately to each other over equal intervals on the focal plane S in FIG. 3, assume positions, each set apart from the next point by a distance d/2. This means that the distances to the point P1 (to the corresponding optical axis L) from the point P2 and the point P3 are both d/4. As long as the distance y from the micro-lens apex plane to the focal plane S is equal to the focal length f of the micro-lenses 40a (y=f), distances x to the optical axis position P1' of the corresponding micro-lens 40a from the centers P2' and P3' of the light-quantity distributions of the blurred images of each pair of points P2 and P3 formed on the photoelectric conversion element array 4b are both d/4. Since the thickness of the micro-lens 40a is negligible and can be considered to be 0, as explained earlier, the distance x to the position P1' of the optical axis of the micro-lens 40a from the center P2' or P3' of the light-quantity distribution of the blurred image of the point P2 or P3 formed on the photoelectric conversion element array 4b can be calculated as expressed in (1) below as the distance y from the micro-lens apex plane to the focal plane S changes.

$$x = d \cdot f/(4 \cdot y) \qquad (1)$$

Namely, the images formed at a given pair of points P2 and P3 on the focal plane is S through the photographic lens 3 are projected via the corresponding micro-lens 40a as blurred images with light-quantity distributions G centered on the positions P2' and P3', set apart by the distance x from the position P1' of the optical axis of the micro-lens 40a assumed on the photoelectric conversion element array 4b. In other words, the image data corresponding to the Gaussian distributions centered on the positions P2' and P3', each set apart by the distance x from the position P1' of the optical axis of the micro-lens 40a, extracted from the photoelectric conversion element output matrix corresponding to the particular micro-lens 40a included in the image data expressing the subject image captured by the image sensor 4, can be used as image data corresponding to images formed at the points P2 and P3 set on the focal plane S set apart by the distance y from the micro-lens apex plane.

The optimal range for the distance y between the micro-lens apex plane and the focal plane S, i.e., the range within which the focusing position should be set, is now examined. As explained earlier, if the distance y is significantly smaller than the focal length f of the micro-lenses 40a, the extent of blurring of the blurred images of the points P2 and P3 will exceed the range of the photoelectric conversion elements 40b covered by the corresponding micro-lens 40a, and thus, it will not be possible to synthesize images. If, on the other hand, the distance y is significantly larger than the focal length f, the blurred images of the points P2 and P3 will become condensed and if they are condensed to an extent at which they are superposed on a photoelectric conversion element 40b present around the optical axis of the corresponding micro-lens 40a, the blurred image light-quantity distributions G will concentrate around the optical axis to make it difficult to separate and analyze the data in units of the individual photoelectric conversion elements 40b. This means that the image synthesis method achieved in the embodiment is effective when the distance y is within a specific range defined in units off representing the focal length of the micro-lenses 40a, substantially between f and 3f.

It is to be noted that this specific range (f to 3f) is not the only possible range and it should be determined in correspondence to the specifications pertaining to the diameter, the curvature and the like of the micro-lenses 40a, the specifications pertaining to the photographic lens 3 and the like.

As long as the distance y between the micro-lens apex plane and the focal plane S is substantially within the specific range (y≈f to 3f), the distance x from the position P1' of the optical axis of each micro-lens 40a to the distribution centers P2' and P3' of the light-quantity distributions G of the blurred images of the points P2 and P3 can be calculated as expressed in (1) within the range of the photoelectric conversion element matrix corresponding to the particular micro-lens 40a. Then, by extracting the image data equivalent to the Gaussian distributions centered on the positions P2' and P3' from the photoelectric conversion element output matrix corresponding to the micro-lens 40a, synthesized images at the points P2 and P3 set on the focal plane S can be generated.

However, if the position of the focal plane S is outside the specific range (y≈f to 3f), the focal plane S needs to be adjusted so as to fit within the specific range (y≈f to 3f) by driving the photographic lens 3. It is to be noted that a specific method that may be adopted when detecting the focusing condition for the photographic lens 3 at a given position within the photographic image plane based upon the outputs from the photoelectric conversion elements at the photoelectric conversion element array 4b will be described in detail later.

Next, a specific method of image synthesis adopted by the image synthesis unit 5d in FIG. 1 is explained. While the following description focuses on the image synthesis processing executed in conjunction with a given micro-lens 40a and the photoelectric conversion element matrix corresponding to the particular micro-lens 40a, similar processing is executed in conjunction with any other micro-lens 40a and the photoelectric conversion element matrix corresponding to the particular micro-lens 40a.

In the embodiment, two-dimensional filter processing is executed for the photoelectric conversion element output matrix corresponding to each micro-lens 40 so as to extract an output matrix equivalent to a light-quantity distribution G such as those shown in FIG. 3. Filter matrix data (hereafter to be simply referred to as a "filter matrix") used in the two-dimensional filter processing indicate individual element values gradually decreasing from the center toward the periphery in line with a Gaussian distribution as indicated in, for instance, FIG. 4, and a normalized matrix with the individual element values each normalized to assume one of 256 values in a range of 0 to 255, is used as the filter matrix data. In other words, the filter matrix represents a weighting coefficient distribution, and each element in the filter matrix indicates a weighting coefficient. Since the photoelectric conversion element output matrix corresponding to each micro-lens 40a is made up with 11 (down)×11 (across) elements, the two-dimensional filter matrix, too, should be made up with 11 (down)×11 (across) elements.

By applying such a two-dimensional filter matrix to the photoelectric conversion element output matrix corresponding to each micro-lens 40a, integrating the data in correspondence to each element and normalizing the data so as to match the pixel output level, an image at the corresponding point on the focal plane S, i.e., an image at the particular virtual pixel, can be synthetically generated.

For instance, the two-dimensional filter matrix shown in FIG. 4 represents a blurred image light-quantity distribution centered on the position P1' of the optical axis of a micro-lens 40a in FIG. 3, and an image at each point P1 on the focal plane S can be synthetically generated by applying this filter matrix to the photoelectric conversion element output matrix corresponding to each micro-lens 40a. In other words, a synthesized image which is generated by the image synthesis-capable camera in the related art described earlier can be obtained in the embodiment.

In the embodiment, a synthesized image constituted with a virtual pixel at the point P2 (see FIG. 13(a)) set on the focal plane S in FIG. 3, is generated by using the two-dimensional filter matrix shown in FIG. 5(a). In addition, a synthesized image constituted with a virtual pixel at the point P3 (see FIG. 13(a)) set on the focal plane S in FIG. 3, is generated by using the two-dimensional filter matrix shown in FIG. 5(b). A synthesized image constituted with a virtual pixel at the point P4 (see FIG. 13(a)) set on the focal plane S over the plane (not shown) rotated relative to the plane in FIG. 3 by 90° around the optical axis of the photographic lens 3, is generated by using the two-dimensional filter matrix shown in FIG. 6(a). In addition, a synthesized image constituted with a virtual pixel at the point P5 (see FIG. 13(a)) set on the focal plane S over the plane (not shown) rotated relative to the plane in FIG. 3 by 90° around the optical axis of the photographic lens 3, is generated by using the two-dimensional filter matrix shown in FIG. 6(b).

FIG. 13(b) shows the relationship among the points P1', P2', P3', P4' and P5' assumed on the photoelectric conversion element array 4b. FIG. 13(b) shows only part of the photoelectric conversion element array 4b. In order to facilitate the explanation, the figure also shows the outer edge of a micro-lens 40a included in the micro-lens array 4a that covers the photoelectric conversion element array 4b. The two-dimensional filters shown in FIGS. 5(a) and 5(b) are matrix filters which take the largest value of 255 at the element corresponding to the positions P2' and P3' set apart by the distance x from the position P1' assumed by the optical axis of the micro-lens 40a on the photoelectric conversion element array 4b in FIG. 3 with the values at other elements gradually decreasing in line with a Gaussian distribution further away from the positions P2' and P3' (see FIG. 13(b)). The matrix in FIG. 5(b) is achieved by rotating the matrix shown in FIG. 5(a) by 180° around the position P1' of the optical axis of the micro-lens 40a.

Likewise, the two-dimensional filters shown in FIGS. 6(a) and 6(b) are matrix filters which take the largest value of 255 at the element corresponding to the positions P4' and P5' (neither shown) set apart by the distance x from the position P1' assumed by the optical axis of the micro-lens 40a on the photoelectric conversion element array 4b at the plane (not shown) rotated relative to the plane shown in FIG. 3 by 90° around the optical axis of the photographic lens 3, with the values at other elements gradually decreasing in line with a Gaussian distribution further away from the positions P4' and P5'. The matrix in FIG. 6(b) is achieved by rotating the matrix shown in FIG. 6(a) by 180° around the position P1' of the optical axis of the micro-lens 40a.

Four virtual pixels are set over uniform intervals for each micro-lens 40a in the embodiment, and thus, four two-dimensional filter matrices that are symmetrical to one another are required. In other words, the two-dimensional filter matrices used in the embodiment are achieved by subsequently rotating a single matrix around the position P1' of the optical axis of the micro-lens 40a in increments of 90° so as to obtain the matrices in FIG. 5(a), FIG. 6(b), FIG. 5(b) and FIG. 6(a) in this order. The position of the matrix element to assume the largest value of 255, i.e., the position on which the corresponding blurred image distribution is to be centered, can be determined as expressed in (1) in correspondence to the position of the focal plane, i.e., in correspondence to the distance y between the micro-lens apex plane and the focal plane.

In other words, different two-dimensional filter matrices, each corresponding to a virtual pixel position, corresponding to a number of virtual pixels and also corresponding to a focal plane position, need to be used and thus, two-dimensional filters each corresponding to a virtual pixel position, a number of virtual pixels and a focal plane position need to be stored in advance in the filter memory 6c (see FIG. 1). With such two-dimensional filters stored in the filter memory in advance, pixel outputs corresponding to a specific focusing position assumed within the specific range (y≈f to 3f) set for the distance y, as described earlier, are obtained, so as to enable generation of a synthesized image with high-definition, i.e., with high resolving power, at the particular focusing position.

It is to be noted that while four virtual pixels are evenly set on a given focal plane S in correspondence to each micro-lens 40a in the embodiment described above, the number of virtual pixels and the positions taken up by the virtual pixels are not limited to these examples.

The image synthesis unit 5d in the drive control device 5 in FIG. 1 reads out image data stored in the image memory 6a, which express an image captured by the image sensor 4, and creates an output matrix pertaining to the photoelectric conversion elements corresponding to each micro-lens. The focusing condition for the photographic lens 3 at the focus detection position that has been manually or automatically set within the captured image is detected by pupil data extraction unit 5a, the data string forming unit 5b and the focus calculation unit 5c in the drive control device 5.

It is to be noted that the focus detection position may be manually set by the photographer by moving a cursor to a desired subject position upon which he wishes to focus while viewing the captured image brought up on display at a monitor (not shown) located on the back side of the camera. As an alternative, a person's face in the image may be recognized by processing the captured image and the face area may then be automatically selected as the desired focusing position.

The image synthesis unit 5d detects the focal plane position, i.e., the distance y from the micro-lens apex plane, based upon the focus detection results obtained at the focus detection position set within the image and makes a decision as to whether or not the distance y is substantially within the predetermined range (y≈f to 3f) relative to the focal length y of the micro-lenses. If the distance y is judged to be outside the specific range, the drive control device 5 executes control so as to adjust the focusing condition for the photographic lens 3 by, for instance, driving the motor of the photographic lens 3 via the lens drive control unit 5e, until the focal plane corresponding to the focus detection position is set within the predetermined range.

If the position of the focal plane at the selected focus detection position is determined to be within the predetermined range, the filters corresponding to the virtual pixels and the focal plane position, among the two-dimensional filters stored in the filter memory 6c, are retrieved through a search. Then, the two-dimensional filter matrices are applied to the photoelectric conversion element output matrix corresponding to each micro-lens, the products corresponding to the individual elements are individually integrated and finally the integrated values are normalized so as to achieve a level optimal for pixel outputs.

The image synthesis unit 5d executes the processing described above for each of the virtual pixels set for each micro-lens so as to obtain four virtual pixel outputs in correspondence to each micro-lens. Lastly, a synthesized image is generated by expanding the four virtual pixel outputs corresponding to each micro-lens over the two-dimensional plane in conformance to the positions of the micro-lens and the virtual pixels.

Figure 7:
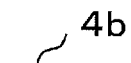
FIG. 7 indicates the positional relationship between virtual pixels on the focal plane and the projection images projected onto the photoelectric conversion element array via the micro-lenses.
Figure 7:

The following alignment processing is executed for the virtual pixel outputs when generating the synthesized image by expanding the four virtual pixel outputs corresponding to each micro-lens over the expanse of the two-dimensional plane. As shown in FIG. 3, the positional relationship between the points P2 and P3 set for each micro-lens on the focal plane S is reversed for the positional relationship between the blurred images projected at the corresponding positions P2' and P3' on the micro-lens array 4b. Accordingly, the blurred images formed at the positions P2', P3', P4' and P5' on the photoelectric conversion element array 4b, which are arrayed as shown in FIG. 7(a), are aligned in conformance to the positional arrangement assumed for the points P2, P3, P4 and P5 on the focal plane S, as shown in FIG. 7(b). It is to be noted that the points P4, P4', P5 and P5' in FIG. 7 are set at the section obtained by cutting away parts of the micro-lens array 4a and the photoelectric conversion element array 4b across the plane rotated relative to the plane in FIG. 3 by 90° around the optical axis of the photographic lens 3 (see FIG. 13).

Next, a focus detection method that may be adopted in conjunction with the pupil data extraction unit 5a, the data string forming unit 5b and the focus calculation unit 5c in FIG. 1 is described. Areas R1 and R2 in FIG. 2, assuming symmetrical positions, one to the left and the other to the right relative to the position L of the optical axis of the micro-lens 40a, and each made up with three photoelectric conversion elements 40b are projected onto the exit pupil of the photographic lens 3 via the corresponding micro-lens 40a and forms a pair of projection areas on the exit pupil. A pair of light fluxes passing through the pair of projection areas on the exit pupil of the photographic lens 3 are guided via the photographic lens 3 and the micro-lens to the areas R1 and R2 assuming symmetrical positions, one to the left and the other to the right relative to the center set at the micro-lens optical axis position and each made up with three photoelectric conversion elements 40b. As a result, a pair of pupil images (a right pupil image and a left pupil image) are formed respectively on the area R1 and the area R2.

The phase difference manifested by the pair of pupil images, i.e., the extent of image shift, changes in correspondence to the focusing condition for the photographic lens 3. Accordingly, through an arithmetic operation executed to calculate the image shift amount indicating the extent of image shift based upon a pair of sets of image data (a pair of sets of pupil data) corresponding to the pair of pupil images output from the three photoelectric conversion elements 40a in the area R1 and the three photoelectric conversion elements 40a in the area R2, the focusing condition for the photographic lens 3, i.e., the extent of defocusing relative to the predetermined focal plane, can be detected through the method known as the "split-pupil phase detection method".

It is to be noted that the positions and the number of the photoelectric conversion elements from which a pair of sets of pupil data, i.e., the right pupil data and the left pupil data, are extracted, are not limited to those in the embodiment indicated in FIG. 2. In addition, while image data are extracted from photoelectric conversion elements located at positions achieving left/right symmetry in the example described above, image data may be extracted from photoelectric conversion elements located at positions achieving top/bottom symmetry or diagonal symmetry in correspondence to the focus detection direction.

The data string forming unit 5b in the drive control device 5 sorts pairs of left pupil data and right pupil data corresponding to a predetermined number of micro-lenses arrayed side-by-side along the left/right direction so as to form a right pupil data string and a left pupil data string by stringing the right pupil data alone and the left pupil data alone, separately from each other, in the order matching the micro-lens arraying order.

The focus calculation unit 5c in the drive control device 5 reads out the pair of pupil data strings, i.e., the left pupil data string and the right pupil data string, from the image memory 6a and detects the focusing condition for the photographic lens 3 by executing a focus detection operation (correlation calculation) with the pupil data strings thus read out through the split-pupil phase detection method described earlier.

The following is a brief description of the focus detection operation executed based upon the pair of data strings, which is of the known art. $A\{a_i\}$ and $B\{b_i\}$ represent the pupil data strings in the pair of pupil data strings, i.e., the left pupil data string and the right pupil data string, and it is assumed that each pupil data string is made up with N sets of data (i=1, 2, ... N). With k representing the extent of shift (shift amount) manifested by the pair of data strings A and B, a difference D(k) between the data string A and the data string B can be expressed as in (2) below.

$$D(k)=\Sigma|a_{i+k}-b_i| \quad (2)$$

By using expression (2), the shift amount k achieving the least difference D(k) is determined. Since the pair of data strings A and B are discrete sequences, a true shift amount k at which the difference D(k) assumes the least value cannot be determined with resolving power equal to or greater than the micro-lens intervals.

Since the pair of data strings A and B may be regarded as synthesized sine wave data, expression (2) can be considered to be equivalent to expression (3) pertaining to the sine wave signal assuming a spatial frequency co in the synthesized sine wave data.

$$D(\theta)=K\int|\sin(\omega x+\theta)-\sin \omega x|dx \quad (3)$$

Then, the following expression can be written by modifying expression (3).

$$D(\theta)=K'|\sin(\theta/2)\cdot\sin(\omega x+\phi)|dx \quad (4)$$

Figure 8:
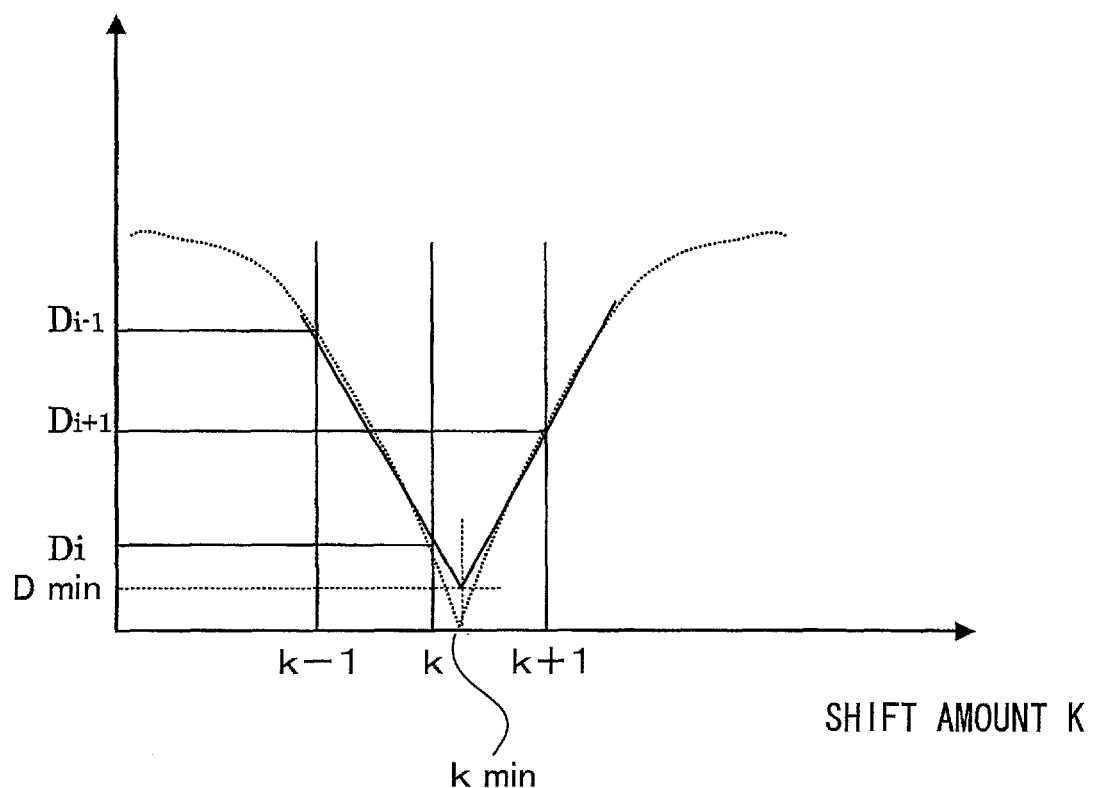
FIG. 8 illustrates the principle of the three-point interpolation processing executed as part of the focus detection calculation.

Expression (4) is applicable to other spatial frequencies as well and since they, too, are independently multiplied by the term pertaining to θ, the difference expression obviously changes in correspondence to the sine wave absolute value. In addition, since the sine wave assumes a linear waveform when θ is close to 0, the bottom of the dip formed by the straight line on the left side and the straight line on the right side with matching slopes, as shown in FIG. 8, can be regarded to assume the smallest value.

The true shift amount k achieving the least difference D is determined through the following three-point interpolation operation. First, the smallest value D(j) assumed for the difference D(k) and the corresponding shift amount k=j are determined by using expression (2). Next, differences D(j−1) and D(j+1) corresponding to shift amounts k=(j−1) and k=(j+1) respectively preceding and succeeding the shift amount k=j at which the least value D(j) is achieved are ascertained. The following description is given by assuming that the difference D(j−1) is greater than the difference D(j+1). A straight line connecting two points (k, D(k))=(j, D(j)) and (j−1, D(j−1)) and having a slope "a" is drawn. The straight line assumes a slope a. Then, a straight line with a slope (−a), passing through the point (j+1, D(j+1)) corresponding to the shift amount k=(j+1) at which the second smallest difference D(j+1) is achieved, is drawn, the difference D(k) calculated for the intersecting point at which the two straight lines intersect each other is designated as a true least value $D_{min}$, and the shift amount k at which the true least difference $D_{min}$ is achieved is designated as a true shift amount $k_{min}$.

The true shift amount $k_{min}$ is then multiplied by a predetermined conversion coefficient m, thereby determining the extent to which the focusing position is offset relative to the predetermined focal plane (micro-lens apex plane) for the subject image formed through the photographic lens 3, i.e., the defocus amount DEF, as expressed in (5) below.

$$DEF=m\cdot k_{min} \quad (5)$$

Through the method described above, the focusing condition for the photographic lens 3 at the focus detection position manually or automatically set within the captured image is detected.

Next, blurred images of virtual pixels are described. As indicated in FIG. 3, the distance x from the position P1' of the micro-lens optical axis assumed on the photoelectric conversion element array 4b to the central positions P2' and P3' of the blurred images of the virtual pixels and the positions of the elements assuming the largest value in the two-dimensional filter matrices change in correspondence to the position of the focal plane S, i.e., in correspondence to the distance y from the micro-lens apex plane to the focal plane S. While two-dimensional filters corresponding to various virtual pixels (P2, P3, P4, P5) and various positions assumed for the focal plane S are stored in advance in the filter memory 6c (see FIG. 1) in the embodiment described above, two-dimensional filters corresponding to specific virtual pixels and a specific focal plane position may be calculated through arithmetic operation each time.

As the position of the focal plane S changes, the conditions of blurring of the blurred images of the virtual pixels also change. As the focal plane S moves further away from the micro-lens array 4a, i.e., as the distance y increases, the images formed at the points P2, P3, P4 and P5 are projected via each micro-lens 40a onto the photoelectric conversion element array 4b with a lesser extent of blurring. In other words, the condition of the projected images becomes closer to a non-blurred state. Accordingly, the element positions at which the largest value is assumed in the two-dimensional filter matrices must be adjusted closer to the position P1' of the micro-lens optical axis and also, the range of the element value distribution set in line with the Gaussian distribution needs to be reduced. The smallest element value distribution of the elements in the two-dimensional filter matrices corresponding to the Gaussian distribution is achieved at the focal plane position at which the distance x from the micro-lens optical axis position P1' to the distribution centers P2' and P3' can be regarded to be 0, i.e., at the focal plane position at which the distance y from the micro-lens apex plane to the focal plane S can be regarded to be infinite.

Assuming that the diameter D of the blurred images is determined in correspondence to the diffraction limit, that the wavelength of the light is 540 nm and that the F number of the micro-lenses is F/2.8, the blurred image diameter D can be calculated as expressed in (6) below.

$$D = 2.44 \cdot \lambda \cdot F \quad (6)$$

The smallest diameter D calculated as expressed in (6) is 3.7 μm, which substantially matches the expected size of the photoelectric conversion elements in the photoelectric conversion element array 4b likely to be used. In the two-dimensional filter matrices used in correspondence to the focal plane position at which the distance x from the micro-lens optical axis position P1' to the distribution centers P2' and P3' can be regarded as 0 and a non-blurred state is presumably achieved, a single element at the center of each distribution may assume a value of 255 with all the remaining elements assuming a value of 0. Namely, two-dimensional filters enabling more accurate virtual pixel outputs can be set by increasing the blurred image diameter D, which takes a value of 0 when the distance x from the micro-lens optical axis position P1' to the distribution centers P2' and P3' is 0, as the distance x lengthens. Through the use of such two-dimensional filters, the quality of the synthesized image can be improved.

Figure 9:
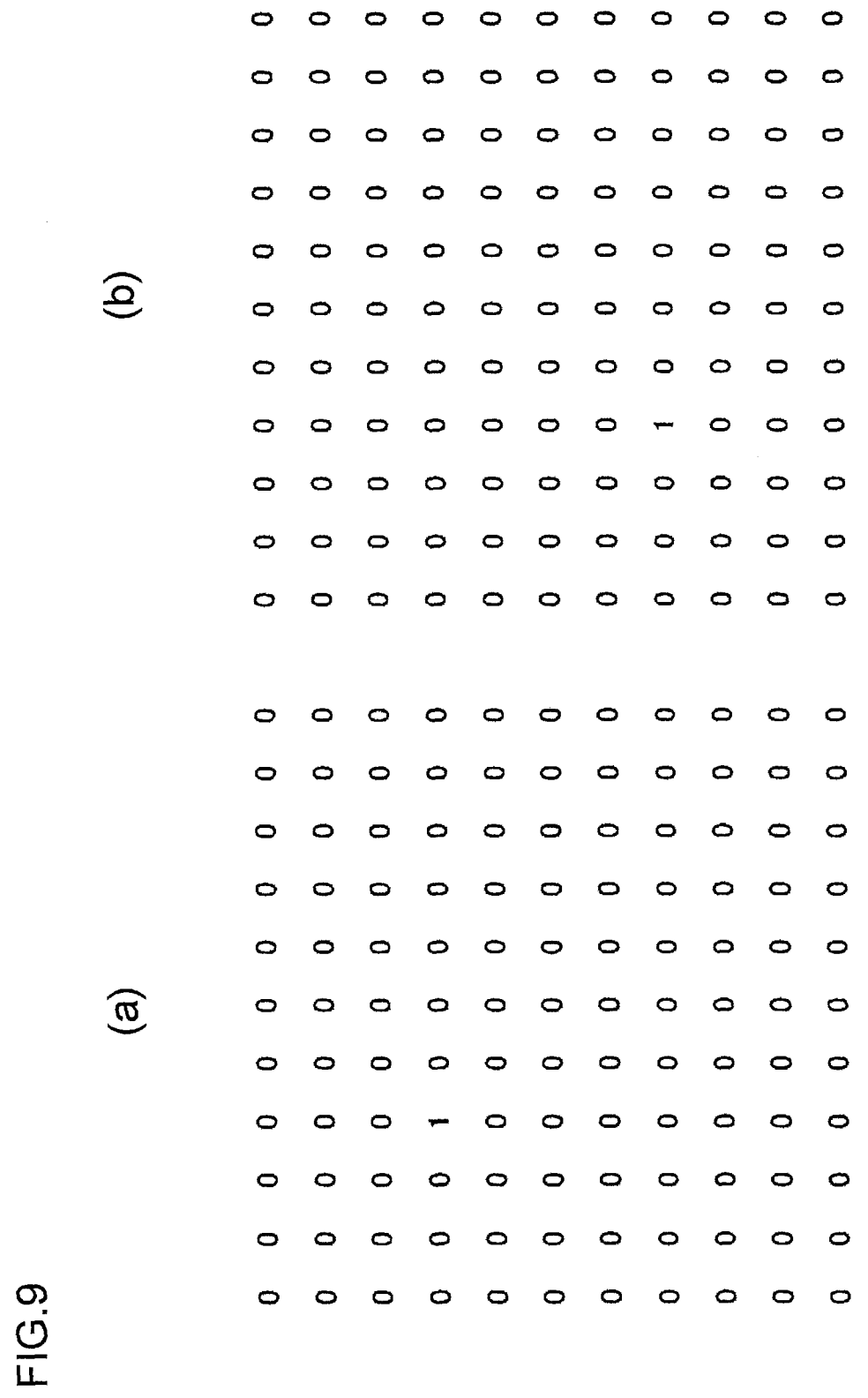

It is to be noted that a synthesized image achieving a certain level of image quality can be obtained by assuming a constant value for the blurred image diameter D, which remains unchanged even as the distance x from the micro-lens optical axis position P1' to the distribution centers P2' and P3' changes, or even by assuming that there is no blur so as to further simplify the processing. In other words, the photoelectric conversion element outputs at the positions P2' and P3', at which the images at the points P2 and P3 are projected via the micro-lens 40a in FIG. 3, alone, may be used as virtual pixel outputs corresponding to the points P2 and P3. In such a case, matrices such as those shown in FIGS. 9(a) and 9(b), with a value other than 0 assumed only at the elements corresponding to the positions P2' and P3' at which the images formed at the point P2 and P3 are projected via the micro-lenses 40a, and all the other elements invariably assuming a value of 0 should be used as the two-dimensional filter matrices.

Next, coordination of the matrix in line with the outer contour of the micro-lens 40a is described. A micro-lens 40a needs to be round in order to be optically effective, whereas a matrix assumes a rectangular shape. This means that the shape of the micro-lens 40a and the photoelectric conversion element matrix corresponding to the micro-lens 40a do not match. The correspondence between the micro-lenses and the photoelectric conversion element matrices can be achieved as long as the micro-lenses 40a are disposed in a square grid array pattern.

Figure 10:
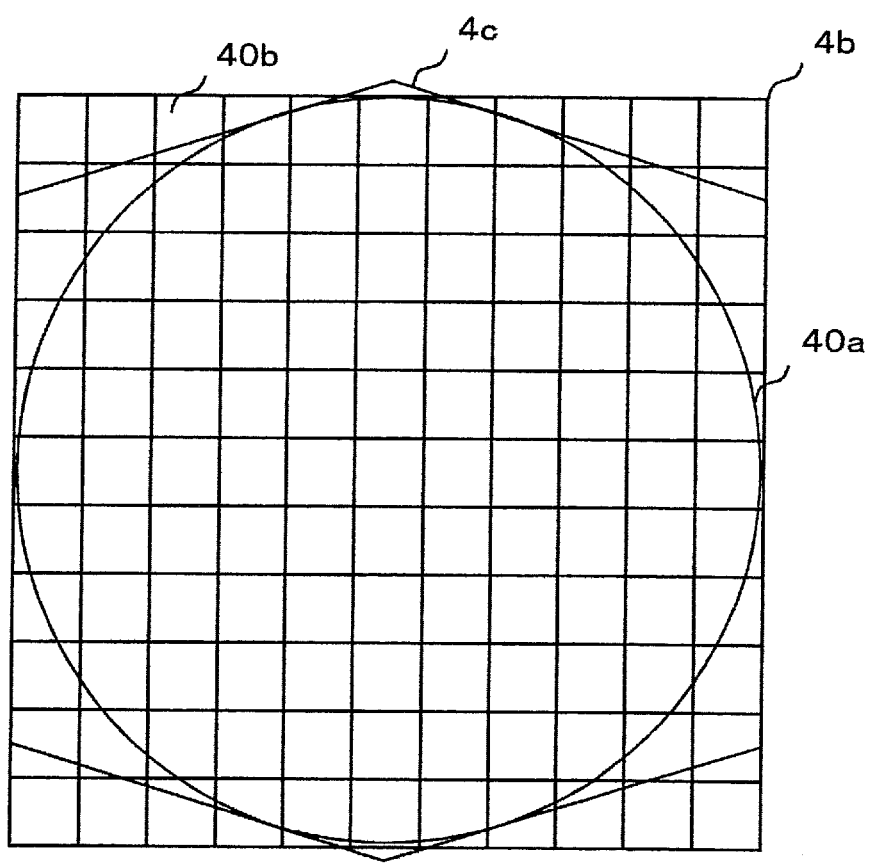
FIG. 10 illustrates the relationship between a micro-lens in a micro-lens array according to a dense hexagonal array pattern and the photoelectric conversion elements corresponding to the micro-lens.
Figure 12:
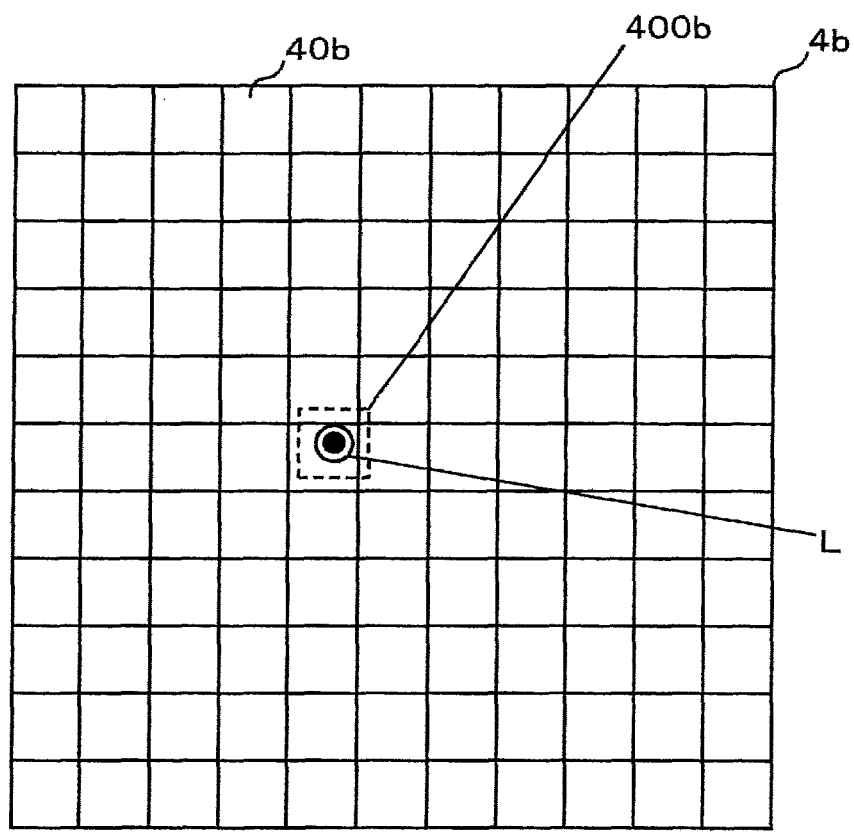
FIG. 12 shows a virtual photoelectric conversion element.

However, when micro-lenses 40a are disposed in a honeycomb array pattern (dense hexagonal array pattern), a photoelectric conversion element matrix corresponding to a given micro-lens 40a may include an element in a photoelectric conversion element matrix corresponding to an adjacent micro-lens 40a, depending upon the specific relationship with which each micro-lens 40a corresponds to a specific photoelectric conversion elements 40b. This potentially problematic issue is addressed by setting the range of the photoelectric conversion elements 40b corresponding to each micro-lens 40a within a circle inscribed within a hexagonal frame 4c containing micro-lenses 40a, as shown in FIG. 10, and by applying a mask matrix such as that shown in FIG. 11 to the photoelectric conversion element output matrix. In the mask matrix shown in FIG. 11, the area made up with a group of elements assuming a value of 1 represents the optically effective area in the micro-lens 40a.

It is to be noted that the present invention allows the embodiment and the variations thereof to be adopted in any possible combination.

The digital camera 1 achieved in the embodiment and the variations thereof described above gives the following advantages.

(1) The digital camera 1 includes the photographic lens 3, the image sensor 4 and the image synthesis unit 5d. The image sensor 4 is equipped with the micro-lens array 4a with a plurality of micro-lenses 40a arrayed in a flat plane and the photoelectric conversion element array 4b with a plurality of photoelectric conversion elements 40b arrayed in a flat plane. The image signals is output based upon light fluxes originating from the subject, transmitted through the photographic lens 3 and received, via the micro-lens array 4a, at the photoelectric conversion element array 4b. Based upon the image signals expressing the image captured at the image sensor 4, the image synthesis unit 5d generates a synthesized image at a given focal plane S of the photographic lens 3. A plurality of virtual pixels P2 to P4 are defined in correspondence to each micro-lens 40a at the focal plane S and two-dimensional filters each corresponding to each of the plurality of virtual pixels P2 to P4 are stored in advance in the filter memory 6c. Filter processing is executed by using the two-dimensional filters for the output matrix pertaining to the plurality of photoelectric conversion elements 40b corresponding to each micro-lens 40a, so as to synthetically generate an image at the focal plane S based upon the outputs of the individual virtual pixels P2 to P4 calculated through the filter processing. Through these measures, a high-resolution, high-definition image can be synthetically generated in correspondence to a given focal plane S of the photographic lens 3 based upon the data expressing the single captured image.

(2) The two-dimensional filters assume different matrix element distributions in correspondence to various focal planes S and the distance x from the distribution centers of the element distributions on the matrices to the position of the optical axis of the micro-lens 40a assumed on the photoelectric conversion element array 4b is adjusted in correspondence to the current focal plane S. As a result, projection images formed by projecting the individual virtual pixels P2 to P4 in correspondence to the particular focal plane S onto the photoelectric conversion element array 4b can be determined with a high level of accuracy and a high-resolution, high-definition image can be synthetically generated with precision.

(3) The pupil data extraction unit 5a, the data string forming unit 5b and the focus calculation unit 5c detect the extent of image shift manifested by a pair of images formed with a pair of light fluxes having passed through the pupil of the photographic lens 3, based upon the outputs from a pair of photoelectric conversion elements among the plurality of photoelectric conversion elements 40b corresponding to each micro-lens 40a. Then, based upon the extent of image shift manifested by the pair of images having been detected, the position of the focal plane S of the photographic lens 3 is detected for the image having been captured by the image sensor 4. It is to be noted that the focal plane S may assume any position. The image synthesis unit 5d synthetically generates an image corresponding to the position of the focal plane S thus detected. As a result, an image corresponding to the focal plane S of the photographic lens 3, which may assume any position, can be synthetically generated based upon the data expressing a single captured image.

(4) The lens drive control unit 5e adjusts the focusing condition for the photographic lens 3 based upon the focus detection results provided via the pupil data extraction unit 5a, the data string forming unit 5b and the focus calculation unit 5c. If the position of the focal plane S detected through the focus detection is outside the predetermined range (e.g., the f to 3f range set relative to the focal length f of the micro-lens 40a), focus adjustment is executed for the photographic lens 3 until the focal plane S is set within the predetermined range. As a result, the image synthesis unit 5d is able to synthetically generate a high-resolution image in correspondence to the focal plane S of the photographic lens 3, which may assume any position, based upon the data expressing a single captured image.

(5) The two-dimensional filter matrices each include element values distributed with a Gaussian distribution centered on the projection position at which each of the virtual pixels P2 to P4 is projected via the micro-lens 40a onto the photoelectric conversion element array 4b. As a result, projection images formed by projecting the individual virtual pixels P2 to P4 in correspondence to the particular focal plane S onto the photoelectric conversion element array 4b can be determined with a high level of accuracy and a high-resolution, high-definition image can be synthetically generated with precision.

(6) Two-dimensional filter matrices each indicating a value equal to or greater than 1 only at the element at the projection position on the photoelectric conversion element array 4b, at which each of the virtual pixels P2 to P4 is projected via the micro-lens 40a with all the other elements indicating a value of 0 are used. The use of these two-dimensional filter matrices allows a high-resolution, high-definition image to be synthetically generated while speeding up the image synthesis process through simplified filter processing.

(7) The image synthesis unit 5d includes a mask filter assuming a matrix with a value of 1 assumed at the elements corresponding to the photoelectric conversion elements 40b present within the optically effective area of each micro-lens 40a and a value of 0 assumed at the elements corresponding to the photoelectric conversion elements 40b outside the effective area. Prior to the filter processing executed with the two-dimensional filters, filter processing is executed by applying the mask filter to the output matrix of the plurality of photoelectric conversion elements 40b corresponding to the particular micro-lens 40a. As a result, regardless of the outer contour of the micro-lens 40a, a photoelectric conversion element output matrix can be obtained by accurately extracting the photoelectric conversion elements 40b within the optically effective area of the micro-lens 40a and projection images of the individual virtual pixels P2 to P4 in correspondence to any focal plane S, projected onto the photoelectric conversion element array 4b, can be determined with a high level of accuracy.

(8) The filter memory 6a where the two-dimensional filters are stored eliminates the need for obtaining the two-dimensional filters through arithmetic operation in correspondence to each set of focal plane S and virtual pixels P2 to P4, and thus simplifies the image synthesis processing.

The disclosure of the following priority application is herein incorporated by reference:

Japanese Patent Application No. 2008-286800 filed Nov. 7, 2008

The invention claimed is:

1. An image processing device that synthetically generates an image of a subject on a given focal plane based upon output data of a plurality of photoelectric conversion elements corresponding to each of a plurality of micro-lenses, the image processing device comprising:
 a drive control unit; and
 an image synthesis unit provided in the drive control unit that
  (1) synthetically generates a first pixel of the image corresponding to a first part in the given focal plane for the subject set based upon output data of first photoelectric conversion elements among the plurality of photoelectric conversion elements corresponding to a micro-lens among the plurality of micro-lenses, light from the first part entering the first photoelectric conversion elements,
  (2) synthetically generates a second pixel of the image corresponding to a second part in the given focal plane for the subject set based upon output data of second photoelectric conversion elements among the plurality of photoelectric conversion elements corresponding to the micro-lens among the plurality of micro-lenses, light from the second part entering the second photoelectric conversion elements, and
  (3) synthetically generates the image which includes more pixels than the plurality of micro-lenses, on the given focal plane.

2. The image processing device according to claim 1, wherein:
 the image synthesis unit (A) synthetically generates the first pixel corresponding to the first part based upon the output data of the first photoelectric conversion elements and photoelectric conversion elements adjacent to the first photoelectric conversion elements, and (B) synthetically generates the second pixel corresponding to the second part based upon the output data of the second photoelectric conversion elements and photoelectric conversion elements adjacent to the second photoelectric conversion elements.

3. The image processing device according to claim 1, further comprising:
 a storage unit that stores information related to a position of the first photoelectric conversion elements and information related to a position of the second photoelectric conversion elements in correspondence to each position of the synthetically generated image along an optical axis of an optical system for capturing the image of the subject.

4. The image processing device according to claim 1, wherein:
(i) a position of one of the first photoelectric conversion elements that is used to synthetically generate the first pixel corresponding to the first part and (ii) a position of one of the second photoelectric conversion elements that is used to synthetically generate the second pixel corresponding to the second part, are based upon (a) a distance between the given focal plane and the plurality of micro-lenses along an optical axis of an optical system, (b) an array patterning pitch of the plurality of micro-lenses and (c) a focal length of the micro-lenses.

5. An image-capturing device that includes a plurality of micro-lenses and an image sensor receiving light from a subject, which has been transmitted through an optical system, by a plurality of photoelectric conversion elements corresponding to each of the plurality of micro-lenses and synthetically generates an image of the subject on a given focal plane based upon output data of the plurality of photoelectric conversion elements corresponding to each of the plurality of micro-lenses, the image-capturing device comprising:
a drive control unit; and
an image synthesis unit provided in the drive control unit that
(1) synthetically generates a first pixel of the image corresponding to a first part in the given focal plane for the subject set based upon output data of first photoelectric conversion elements among the photoelectric conversion elements corresponding to a micro-lens among the plurality of micro-lenses, light from the first part entering the first photoelectric conversion elements,
(2) synthetically generates a second pixel of the image corresponding to a second part in the given focal plane for the subject set based upon output data of second photoelectric conversion elements among the photoelectric conversion elements corresponding to the micro-lens among the plurality of micro-lenses, light from the second part entering the second photoelectric conversion elements, and
(3) synthetically generates the image which includes more pixels than the plurality of micro-lenses, on the given focal plane.

6. The image-capturing device according to claim 5, wherein:
the image synthesis unit (A) synthetically generates the first pixel corresponding to the first part based upon the output data of the first photoelectric conversion elements and photoelectric conversion elements adjacent to the first photoelectric conversion elements, and (B) synthetically generates the second pixel corresponding to the second part based upon the output data of the second photoelectric conversion elements and photoelectric conversion elements adjacent to the second photoelectric conversion elements.

7. The image-capturing device according to claim 5, further comprising:
a storage unit that stores information related to a position of the first photoelectric conversion elements and information related to a position of the second photoelectric conversion elements in correspondence to each position of the synthetically generated image along an optical axis of the optical system.

8. The image-capturing device according to claim 5, wherein:
(i) a position of one of the first photoelectric conversion elements that is used to synthetically generate the first pixel corresponding to the first part and (ii) a position of one of the second photoelectric conversion elements that is used to synthetically generate the second pixel corresponding to the second part, are based upon (a) a distance between the given focal plane and the plurality of micro-lenses along an optical axis of the optical system, (b) an array patterning pitch of the plurality of micro-lenses and (c) a focal length of the micro-lenses.

9. An image processing device that synthetically generates an image of a subject on a given focal plane based upon output data of a plurality of photoelectric conversion elements corresponding to each of a plurality of micro-lenses, the image processing device comprising:
a drive control unit; and
an image synthesis unit provided in the drive control unit that
(1) synthetically generates the image in the given focal plane for the subject set based upon output data of first photoelectric conversion elements among the plurality of photoelectric conversion elements corresponding to a micro-lens among the plurality of micro-lenses, light from a first point entering the first photoelectric conversion elements, and based upon output data of second photoelectric conversion elements among the photoelectric conversion elements corresponding to the micro-lens, light from a second point entering the second photoelectric conversion elements, and
(2) synthetically generates the image which includes more pixels than the plurality of micro-lenses, on the given focal plane.

10. An image processing device that synthetically generates an image of a subject on a given focal plane based upon output data of a plurality of photoelectric conversion elements corresponding to each of a plurality of micro-lenses, the image processing device comprising:
a drive control unit; and
an image synthesis unit provided in the drive control unit that
(1) synthetically generates a first pixel of the image on the given focal plane set based upon output data of first photoelectric conversion elements among the plurality of photoelectric conversion elements corresponding to a micro-lens among the plurality of micro-lenses,
(2) synthetically generates a second pixel of the image on the given focal plane set based upon output data of second photoelectric conversion elements among the photoelectric conversion elements corresponding to the micro-lens,
(3) synthetically generates the image which includes more pixels than the plurality of micro-lenses, on the given focal plane.

* * * * *